June 6, 1939.  G. WAALKES  2,161,210

ROLLER STRUCTURE

Filed Oct. 18, 1937

INVENTOR
Gerrit Waalkes.
BY Harness, Dickey & Pierce.
ATTORNEYS.

Patented June 6, 1939

2,161,210

UNITED STATES PATENT OFFICE 2,161,210

ROLLER STRUCTURE

Gerrit Waalkes, Detroit, Mich., assignor to Anchor Steel & Conveyor Company, Detroit, Mich., a corporation of Michigan Application October 18, 1937, Serial No. 169,617

6 Claims. (Cl. 308—190)

This invention relates to improved roller wheel structures, and particularly relates to an improvement over the type of structure disclosed and claimed in the copending application of Gerrit Waalkes, Serial No. 161,603, filed August 30, 1937.

In the copending application referred to, an anti-friction roller structure is disclosed and claimed, in which the outer bearing race is formed in a recess within a wheel, and a portion of the inner bearing race is formed by an axle member extending into the recess within the wheel and is completed by a collar member having a complementary inner bearing race portion.

One of the primary objects of the present invention is to provide a simplified structure, of the type mentioned above, in which the collar member is adjustably mounted to the axle member so that the complementary inner bearing race forming portions of the collar member and the axle member are so disposed relative to each other that an inner bearing race of proper size and configuration is thereby defined.

Another object of the present invention is to provide a simplified structure in which the members forming one of the bearing races may be conveniently assembled and adjusted relative to each other to properly form the bearing race and thereafter fixed relative to each other so that the bearing race will retain its proper configuration in use.

Another object of the present invention is to provide a structure in which complementary members form one of the bearing races of a roller structure and are so positioned and fixed relative to each other that proper rolling contact between ball bearings, running in the race, and the race is present at all times.

A further object of the present invention is to provide a simplified and improved rugged, anti-friction roller structure which has a long life, and which is economical to manufacture and readily assembled.

Other objects of the invention will become apparent from the following specification, the drawing relating thereto, and from the claims hereinafter set forth.

In the drawing in which like numerals are used to designate like parts in the several views throughout:

Figure 1:
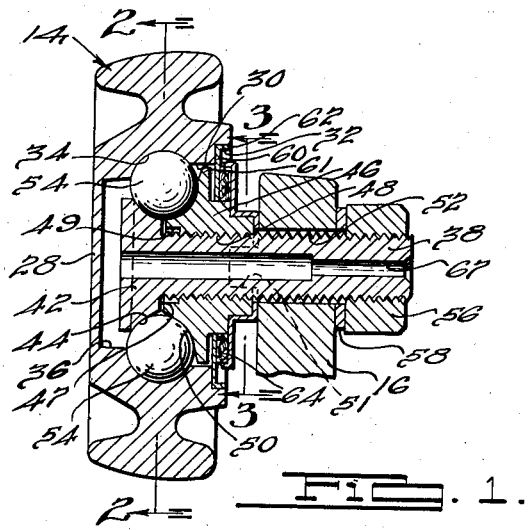
Figure 1 is a fragmentary vertical cross-sectional view of a roller structure embodying features of the present invention.
Figures 2, 3:
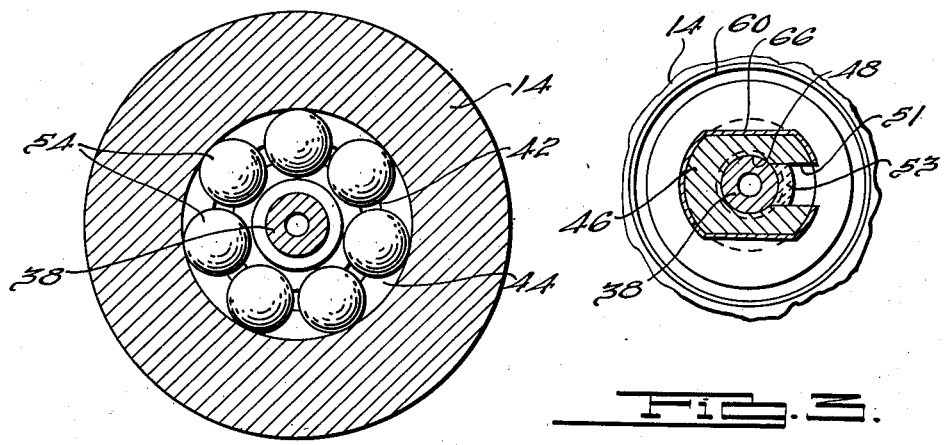
Fig. 2 is a cross-sectional view taken substantially along the line 2—2 of Fig. 1.
Fig. 3 is a cross-sectional view with parts in elevation taken substantially along the line 3—3 of Fig. 1.

The anti-friction roller structure of the present application is particularly adaptable for use with overhead track conveyor assemblies of the type such as those used in automobile factories and assembly lines. While the present invention has particular utility when used with such conveyor systems, it is to be understood that the present invention also finds utility in other types of mechanisms employing anti-friction wheels.

The track conveyor systems referred to are often used in plants or factories in which the operations are continuous, and therefore breakdowns of any of the elements included in the conveyor systems present serious difficulties and in some cases necessitate the complete stoppage of the continuous operation. In some prior types of constructions such break-downs have not only been frequent, but certain of the elements forming part of the conveyor system are of such a complicated nature that repair or replacement takes considerable time with the consequent losses in production.

According to the present invention an anti-friction roller of the type employing ball bearings is provided in which the members forming one of the bearing races are so constructed and arranged relative to each other that the race is properly and accurately defined. This insures proper alignment of the roller on the trackway to which it is applied, and therefore insures smooth and easy operation, which increases the life of the roller structure and its associated parts so that shut-downs due to breakage are materially reduced.

Referring to the drawing, a wheel generally indicated at 14 is connected to a side arm 16 in a manner to be described in detail hereinafter. The side arm 16 may be one arm of a yoke having another similar arm to which a similar wheel 14 is similarly attached. The wheels 14 may engage the trackway of an overhead conveyor in the manner described in the copending application referred to.

The wheel 14 is preferably formed by drop forging and has an integral wall portion 28 closing one end of the wheel with a circular recess 30 axially disposed within the wheel opening through the opposite side or end of the wheel. The recess 30 extends to the inner surface of the wall portion 28 and tapers toward the wall portion 28 and toward the axis of the wheel. The recess 30 includes an annular groove 32 opening through the side of the wheel. An annular groove 34 is formed in the recess 30 at substantially the transverse center of the recess forming an outer bearing race as part of the solid wheel. The wheel is of such depth and the groove 34 is so arranged that a space or portion 36 of the recess 30 is provided between one edge of the groove 34 and the inner face of the wall 28.

An axle member 38 has a stem portion which is externally threaded throughout substantially its length. The axle member 38 also has an enlarged portion 42 which is disposed within the recess 30. The end 42 of the axle member 38 has an annular curved portion 44 which provides one part of an inner bearing race.

A collar member 46 has an opening 48 therethrough which is internally threaded and terminates in an inset annular recess 49. The collar member 46 is threadably received over the stem of the axle member in embracing relation thereto; and when in its assembled position, the collar member 46 lies closely adjacent to a shoulder 47 on the inner end 42 of the axle member. The collar member 46 is provided with a curved portion 50 which is complementary to the curved portion 44 of the axle member to complete the inner bearing race. A slot 51 is provided through one wall of the collar member 46 through to the opening 48 so that a portion of the threaded stem of the axle member 38 is exposed. When the parts are in their assembled positions a weld 53 is applied to the collar member 46 and to the axle member 38 within the slot 51 so that the two members are fixed relative to each other.

The axle member 38 also extends through an opening 52 in the arm 16 adjacent the top thereof, in which the surface defining the opening 52 is adapted to bear against the threads of the axle member 38. Ball bearing members 54 are positioned within the ball bearing race formed by the outer race 34 and by the inner race including the curved portions 44 and 50.

The balls 54 and the axle member 38 and the collar member 46 as a unit are held in proper relative position to the wheel 14 by a nut 56 which is threadably received over the outer threaded end of the axle member 38. A lock washer 58 is preferably interposed between the nut 56 and the arm 16, and, upon tightening of the nut, the members are properly positioned relative to each other.

The peripheral edge 61 of the collar member 46 is of such a diameter that slight clearance only is permitted between the recess 30 and the collar member so that the load is properly carried by the ball bearings 54.

For convenient assembly of the roller structure, the diameter of the recess 30 at the portion 36 adjacent the wall 28 is larger than the diameter of the end 42 of the axle member, and the depth of the recess is such, relative to the dimensions of the axle 38 that movement of the end 42 within the portion 36 is permissible.

In assembling the roller structure the axle member 38 may first be inserted within the recess 30; and since the diameter at 36 is greater than the diameter of the inner portion of the enlarged end 42, the axle member 38 may be disposed toward one side so that the ball bearing members 54 may be readily inserted in the space between the axle member and the walls of the recess 30. The collar member 46 may then be threaded over the threaded stem of the axle member 38 until it reaches its innermost position. As the collar member 46 approaches its innermost position the curved wall 50 engages the balls 54 and axially aligns the axle member 38. In order that the collar member 46 and the enlarged end 42 of the axle member may be positioned relative to each other so as to provide an inner ball race of proper size and configuration, the collar member 46 may be first drawn tightly to its innermost position, and by then backing it off slightly the proper running fit between the balls and both inner and outer races will be obtained. The collar 46 and axle member 38 may then be fixed together by the weld 53 within the slot 51 so that displacement of the two members during use is not possible. By welding in the slot the protuberance caused by the weld lies entirely within the slot and within the confines of the collar, so that the weld does not interfere with the operation of any of the associated parts.

A longitudinally extending opening 67 is provided through the axle member 38 axially thereof and communicates with the interior of the recess 30 so as to provide an opening through which a lubricant may be supplied to the interior of the wheel.

In order to keep the grease or other lubricant within the wheel, a disc member 60 having an outwardly directed annular flange 62 is mounted within the groove 32 in surrounding relation to the collar 46. An annular felt washer 64 embraces the collar 46 and is held in place by a cooperating disc member 66 which is also mounted over the axle 38 and is provided with step shoulder portions which engage the collar 36, and the washer 64 to hold the elements securely in position and prevent the escape of grease from the wheels.

Formal changes may be made in the specific embodiment of the invention described without departing from the spirit and substance of the invention described, the scope of which is commensurate with the appended claims.

What is claimed is:

1. A solid wheel formed with one end closed and the other end open and having an axially disposed recess therein opening through said open end, an annular groove formed in said recess at substantially the transverse center thereof forming an outer bearing race, said axle member having one end enclosed within said recess and having one end formed to provide a portion of an inner bearing race, a collar member mounted in embracing relation to said axle member having a portion extending into said recess, said last named portion being formed to provide a complementary portion to said one end of said axle member to complete an inner bearing race, said groove and said inner bearing race forming a ball race, balls within said ball race, and said collar member and said axle member being welded together after assembly by a weld which lies within the peripheral confines of said collar so as not to interfere with the operation of any of the associated parts.

2. A solid wheel formed with one end closed and the other end open and having an axially disposed recess therein opening through said open end, an annular groove formed in said recess at substantially the transverse center thereof forming an outer bearing race, an axle member having one end disposed within said recess and having said one end formed to provide a portion of an inner bearing race, said axle member being externally threaded adjacent said one end, an internally threaded collar member threadably received over said axle member to thereby adjust said collar member relative to said axle member axially of said axle member, said collar member having a portion extending into said recess, said last named portion being formed to provide a complementary portion to said one end of said axle member to complete an inner bearing race, said groove and said inner bearing race forming a ball race, balls within said ball race, and said collar member and said axle member being welded together after assembly by a weld which lies within the peripheral confines of said collar so as not to interfere with the operation of any of the associated parts.

3. A solid wheel formed with one end closed and the other end open and having an axially disposed recess therein opening through said open end, an annular groove formed in said recess at substantially the transverse center thereof forming an outer bearing race, an axle member having one end disposed within said recess and having said one end formed to provide a portion of an inner bearing race, said axle member being externally threaded adjacent said one end, an internally threaded collar member threadably received over said axle member to thereby adjust said collar member relative to said axle member axially of said axle member, said collar member having a radially extending slot through the wall thereof exposing a portion of the threading of said axle member, said collar member having a portion extending into said recess, said last named portion being formed to provide a complementary portion to said one end of said axle member to complete an inner bearing race, said groove and said inner bearing race forming a ball race, balls within said ball race, and said collar member and said axle member being welded together after assembly by a weld within said slot.

4. A solid wheel having a substantially circular space axially disposed thereof, an annular groove formed in said space at substantially the transverse center thereof forming an outer bearing race, an axle member having one end disposed within said space and having said one end formed to provide a portion of an inner bearing race, said axle being externally threaded adjacent said one end, an internally threaded collar member threadably received over said axle member, said collar member having a radially extending slot through the wall thereof exposing a portion of the threads on said axle member, said collar member having a portion extending into said space, said last named portion being formed to provide a complementary portion to said one end of said axle member to complete the inner bearing race, said groove and said inner bearing race forming a ball race, balls within said ball race and said collar member and said axle member being welded together after assembly by a weld entirely within the confines of said slot.

5. A wheel having an axially disposed recess therein opening through one end, an annular groove formed in said recess at substantially the transverse center thereof forming an outer bearing race, an axle member having one end disposed within said recess and having said one end formed to provide a portion of an inner bearing race, a collar member mounted in embracing relation to said axle member, said collar member having a radially extending slot through the wall thereof exposing a portion of said axle member, said collar member having a portion extending into said recess, said last named portion being formed to provide a complementary portion to said one end of said axle member to complete an inner bearing race, said groove and said inner bearing race forming a ball race, balls within said ball race, and said collar member and said axle member being welded together after assembly by a weld within said slot.

6. A wheel having an axially disposed recess therein opening through one end thereof, an annular groove formed in said recess at substantially the transverse center thereof forming an outer bearing race, an axle member having one end disposed within said recess and having said one end formed to provide a portion of an inner bearing race, said axle member being externally threaded adjacent said one end, an internally threaded collar member threadably received over said axle member to thereby adjust said collar member relative to said axle member axially of said axle member, said collar member having a radially extending slot through the wall thereof exposing a portion of the threading of said axle member, said collar member having a portion extending into said recess, said last named portion being formed to provide a complementary portion to said one end of said axle member to complete an inner bearing race, said groove and said inner bearing race forming a ball race, balls within said ball race, and said collar member and said axle member being welded together after assembly by a weld within said slot.

GERRIT WAALKES.